United States Patent
Freitag et al.

(10) Patent No.: US 12,039,286 B2
(45) Date of Patent: Jul. 16, 2024

(54) AUTOMATIC POST-EDITING MODEL FOR GENERATED NATURAL LANGUAGE TEXT

(71) Applicant: GOOGLE LLC, Mountain View, CA (US)

(72) Inventors: Markus Freitag, Sunnyvale, CA (US); Isaac Caswell, Palo Alto, CA (US); Howard Scott Roy, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/700,123

(22) Filed: Mar. 21, 2022

(65) Prior Publication Data

US 2022/0215183 A1    Jul. 7, 2022

Related U.S. Application Data

(63) Continuation of application No. 16/511,806, filed on Jul. 15, 2019, now Pat. No. 11,295,092.

(51) Int. Cl.
*G06F 40/51*         (2020.01)
*G06F 40/166*        (2020.01)
(Continued)

(52) U.S. Cl.
CPC .......... *G06F 40/51* (2020.01); *G06F 40/166* (2020.01); *G06F 40/253* (2020.01); *G06F 40/58* (2020.01); *G10L 13/00* (2013.01)

(58) Field of Classification Search
None
See application file for complete search history.

(56) References Cited

U.S. PATENT DOCUMENTS 8,065,151 B1 * 11/2011 Bangalore ............... G10L 15/22
                                                        704/270.1
9,164,982 B1 * 10/2015 Kaeser .................... G06F 40/56
(Continued)

FOREIGN PATENT DOCUMENTS

EP      2299369     3/2011
EP      3447655     2/2019

OTHER PUBLICATIONS

Tebbifakhr et al. "Multi-source Transformer for Automatic Post-Editing of Machine Translation Output". Emerging Topics from the Fifth Italian Conference on Computational Linguistics, vol. 5, No. 1, Jun. 2019 (Year: 2019).*

(Continued)

*Primary Examiner* — Jesse S Pullias
(74) *Attorney, Agent, or Firm* — Gray Ice Higdon

(57) ABSTRACT

Techniques are disclosed for training and/or utilizing an automatic post-editing model in correcting translation error(s) introduced by a neural machine translation model. The automatic post-editing model can be trained using automatically generated training instances. A training instance is automatically generated by processing text in a first language using a neural machine translation model to generate text in a second language. The text in the second language is processed using a neural machine translation model to generate training text in the first language. A training instance can include the text in the first language as well as the training text in the first language.

19 Claims, 10 Drawing Sheets

(51) Int. Cl.
  *G06F 40/253* (2020.01)
  *G06F 40/58* (2020.01)
  *G10L 13/00* (2006.01)

(56) References Cited

U.S. PATENT DOCUMENTS

| | | | |
|---|---|---|---|
| 9,176,952 B2 | 11/2015 | Aikawa et al. | |
| 10,248,651 B1* | 4/2019 | Fuerstenau | G06F 40/51 |
| 10,896,295 B1* | 1/2021 | Shenoy | G10L 15/187 |
| 11,295,092 B2* | 4/2022 | Freitag | G10L 13/00 |
| 2006/0178868 A1* | 8/2006 | Billerey-Mosier | G06F 40/56 704/9 |
| 2009/0076792 A1 | 3/2009 | Lawson-Tancred | |
| 2009/0326913 A1 | 12/2009 | Simard et al. | |
| 2010/0138210 A1 | 6/2010 | Seo et al. | |
| 2014/0163963 A2* | 6/2014 | Dahlmeier | G06F 40/274 704/9 |
| 2015/0220513 A1 | 8/2015 | Lyman et al. | |
| 2015/0279366 A1* | 10/2015 | Krestnikov | G10L 15/26 704/235 |
| 2017/0091177 A1 | 3/2017 | Sonoo et al. | |
| 2020/0104371 A1 | 4/2020 | Ma et al. | |
| 2020/0152186 A1* | 5/2020 | Koh | G10L 15/08 |

OTHER PUBLICATIONS

Liyanapathirana et al. "Using the TED Talks to Evaluate Spoken Post-editing of Machine Translation". In Proceedings of the Tenth International Conference on Language Resources and Evaluation (LREC'16), May 2016, pp. 2232-2239 (Year: 2016).*
Kiesel et al. "Clarifying False Memories in Voice-based Search", CHIIR '19, Mar. 10-14, 2019, Glasgow, United Kingdom (Year: 2019).*
He, D. et al., "Dual Learning for Machine Translation"; in Conference on Advances in Neural Information Processing Systems (NeurIPS); 2016; 9 pages.
Zoph et al.; Multi-Source Neural Translation; arXiv perprint arXiv:1601.00710v1 [cs.CL]; dated Jan. 5, 2016.
Artetxe, M. et al., "Unsupervised Statistical Machine Translation"; in Proceedings of the 2018 Conference on Empirical Methods in Natural Language Processing; 2018; pp. 3632-3642.
Artetxe, M. et al., "Unsupervised Neural Machine Translation"; in International Conference on Learning Representations; 2018; 12 pages.
Bahdanau, D. et al., "Neural Machine Translation by Jointly Learning to Align and Translate"; in 3rd International Conference on Learning Representations; 15 pages; 2015.
Bannard, C. et al., "Paraphrasing with Bilingual Parallel Corpora"; in Proceedings of the 43rd Annual Meeting on Association for Computational Linguistics; 2005; pp. 597-604.
Bojar, O. et al., "Findings of the 2017 Conference on Machine Translation (WMT17)"; in Proceedings of the Second Conference on Machine Translation; 2017; 68 pages.
Brants, T. et al., "Large Language Models in Machine Translation"; in Proceedings of the 2007 Joint Conference on Empirical Methods in Natural Language Processing and Computational Natural Language Learning; 2007; 10 pages.
Cheng, Y. et al., "Semi-Supervised Learning for Neural Machine Translation"; in Proceedings of the 54th Annual Meeting of the Association for Computational Linguistics; 2016; vol. 1, pp. 1965-1974.
Cotterell, R. et al., "Explaining and Generalizing Back-Translation through Wake-Sleep"; arXiv preprint arXiv:1806.04402; 2018; 7 pages.
Domhan, T. et al., "Using Target-Side Monolingual Data for Neural Machine Translation through Multi-task Learning"; in Proceedings of the 2017 Conference on Empirical Methods in Natural Language Processing; 2017; pp. 1500-1505.
Edunov, S. et al., "Understanding Back-Translation at Scale"; in Proceedings of the 2018 Conference on Empirical Methods in Natural Language Processing; 2018; pp. 489-500.
Gulcehre, C. et al., "On Using Monolingual Corpora in Neural Machine Translation"; arXiv preprint arXiv:1503.03535; 2015; 9 pages.
Junczys-Dowmunt, M., "Microsoft's Submission to the WMT2018 News Translation Task: How I Learned to Stop Worrying and Love the Data"; in Proceedings of the Third Conference on Machine Translation, vol. 2: Shared Task Papers; Association for Computational Linguistics; 2018; pp. 425-430.
Lample, G. et al., Unsupervised Machine Translation Using Monolingual Corpora Only; in International Conference on Learning Representations; 2018; 14 pages.
Lample, G. et al., "Phrase-Based & Neural Unsupervised Machine Translation"; in Proceedings of the 2018 Conference on Empirical Methods in Natural Language Processing (EMNLP); 2018; 11 pages.
Mallinson, J. et al., "Paraphrasing Revisited with Neural Machine Translation"; in Proceedings of the 15th Conference of the European Chapter of the Association for Computational Linguistics: vol. 1, Long Papers, vol. 1; 2017; pp. 881-893.
Niu, X. et al., "Bi-Directional Neural Machine Translation with Synthetic Parallel Data"; ACL 2018; 8 pages.
Papineni, K. et al., "Bleu: A Method for Automatic Evaluation of Machine Translation"; in Proceedings of the 40th Annual Meeting on Association for Computational Linguistics, . Association for Computational Linguistics; 2002; 8 pages.
Peter, J. et al., "The QT21/HimL Combined Machine Translation System"; in Proceedings of the First Conference on Machine Translation; 2016; pp. 344-355.
Poncelas, A. et al., "Investigating Backtranslation in Neural Machine Translation"; in Proceedings of the 21st Annual Conference of the European Association for Machine Translation; 2018; pp. 249-258.
Post, M. "A Call for Clarity in Reporting Bleu Scores"; arXiv preprint arXiv:1804.08771; 2018; 6 pages.
Sennrich, R. et al., "Edinburgh Neural Machine Translation Systems for WMT 16"; in Proceedings of the First Conference on Machine Translation; 2016; pp. 371-376.
Sennrich, R. et al., "Improving Neural Machine Translation Models with Monolingual Data"; in Proceedings of the 54th Annual Meeting of the Association for Computational Linguistics (vol. 1: Long Papers); 2016; pp. 86-96.
Shaw, P. et al., "Self-Attention with Relative Position Representations"; in Proceedings of the 2018 Conference of the North American Chapter of the Association for Computational Linguistics: Human Language Technologies; 2018; pp. 464-468.
Shen, J. et al., "Lingvo: A Modular and Scalable Framework for Sequence-to-Sequence Modeling"; CoRR, arXiv:1902.08295; 2019; 17 pages.
Stahlberg, F. et al., "The University of Cambridge's Machine Translation Systems for WMT18"; in Proceedings of the Third Conference on Machine Translation, vol. 2: Shared Task Papers; 2018; pp. 504-512.
Vaswani, A. et al. "Attention Is All You Need"; in Advances in Neural Information Processing Systems; 2017; 11 pages.
Hoang, C. et al., "Iterative Backtranslation for Neural Machine Translation"; in Proceedings of the 2nd Workshop on Neural Machine Translation and Generation, vol. 1; 2018; pp. 18-24.
Xia, Y. et al., "Dual Supervised Learning"; in International Conference on Machine Learning; 2017; 11 pages.
Zhang, Z. et al., "Joint Training for Neural Machine Translation Models with Monolingual Data"; in Thirty-Second AAAI Conference on Artificial Intelligence; 2018; 8 pages.
Gehring, J. et al., "Convolutional Sequence to Sequence Learning"; in Proceedings of the 34th International Conference on Machine Learning—vol. 70; 2017; pp. 1243-1252.
Koppel, M. et al., "Translationese and Its Dialects"; in Proceedings of the 49th Annual Meeting of the Association for Computational Linguistics: Human Language Technologies—vol. 1; 2011; pp. 1318-1326.
Gulcehre, C. et al., "On Integrating a Language Model into Neural Machine Translation"; Comput. Speech Lang.; 2017; pp. 137-148.

(56) References Cited

OTHER PUBLICATIONS

Wu, W. et al. "Improving Neural Machine Translation with Neural Sentence Rewriting"; in 2018 International Conference on Asian Language Processing (IALP).
Warner, M., "The Politics of Translation"; London Review of Books; 40 No. 19:22; 2018.
Selinker, L. "Interlanguage"; International Review of Applied Linguistics; 1972; pp. 209-231.
Gellerstam, M. "Translationese in Swedish Novels Translated from English"; Translation Studies in Scandinavia; 1986; pp. 88-95.

* cited by examiner

AUTOMATIC POST-EDITING MODEL FOR GENERATED NATURAL LANGUAGE TEXT

BACKGROUND

Machine translation can use one or more computing devices to translate text, speech, etc. from a first language to a second language. For example, a machine translation process can substitute words in a first language with corresponding words in a second language. However, a simple substitution of words can generate inaccurate translations because a phrase can have a specific meaning that is different than a literal translation of each word within a phrase. For example, the English phrase "leap year" has a specific meaning (i.e., a year that includes February $28^{th}$) but a word for word substitution can translate "leap year" into the second language as words that indicate a year that leaps.

Neural machine translation ("NMT") models can use artificial neural networks to predict the likelihood of a sequence of words. In many implementations, NMT models can translate an entire phrase and/or sentence at a time. Translating an entire sentence and/or phrase, rather than individual tokens (i.e., individual characters, individual words, etc.) can leverage the overall context of the textual and/or spoken input. NMT models can utilize a variety of neural network learning techniques to perform translation including feature learning techniques, deep learning techniques, etc.

SUMMARY

Implementations described herein are directed towards generating edited text, that corrects translation error(s) introduced by a NMT model, by processing text containing translation error(s) using an automatic post-editing ("APE") model. In many implementations, translation error(s) can include one or more words incorrectly translated using the NMT model from a source language into a target language. For example, the word club meaning a cudgel in the source language can incorrectly be translated into the word club meaning an organization in the target language by a NMT model.

An APE model can be trained, for use in correcting translation error(s), by using automatically generated training instances. For example, training instances can be automatically generated in an unsupervised manner. As described herein, automatic generation of training instances can conserve network and/or client device resources. In many implementations, a training instance can include training text and ground truth text. The training text can be automatically generated by processing the ground truth text using a NMT model to translate the ground truth text from a first language into a second language. The text generated in the second language is translated back into the first language using a NMT model to generate the training text in the first language. The training text and ground truth text can be stored as a training instance. For example, German ground truth text can be translated into Spanish text. The Spanish text can be translated back into German to generate the training text using an NMT model.

In many implementations, an APE model can be trained to correct translation errors in text translated into a target language from a source language. For example, a first APE model can be trained to correct translation errors in German text translated from English text; a second APE model can be trained to correct translation errors in German text translated from Spanish text; a third APE model can be trained to correct translation errors in French text translated from Spanish text; etc. Additionally or alternatively, a multilingual APE model can be trained to correct translation errors in a target language translated from many source languages. For example, the multilingual APE model can be trained to correct Italian text translated from English text, to correct Italian text translated from French text, to correct Italian text translated from Spanish text, and to correct Italian text translated from additional and/or alternative source language(s). Such a multilingual APE model can occupy less electronic storage space than multiple monolingual APE models. This savings in storage space can be beneficial, for example, when the multilingual APE model is utilized on a client device with limited storage capacity. Further, and as described herein, training of a multilingual model for N languages can occur with less training iterations than training of N separate monolingual models for each language.

Additionally or alternatively, translation error(s) can include grammatical gender translation error(s). Nouns in some (but not all) languages include an inherent gender. For example, French nouns can either be masculine or feminine, German nouns can be either masculine, feminine, or neuter, etc. Some nouns can have different gender depending on the context. For example, the English word "aide" can be translated into French as "un aide" meaning a male assistant as well as "une aide" meaning a female assistant. Furthermore, some nouns can have different meanings depending on the gender. As another example, the French word rose has a masculine form and a feminine form. The masculine form "le rose" can be translated into English as pink meaning the color while the feminine form "la rose" can be translated into English as a rose meaning the flower. In contrast, nouns in some languages, such as English, lack a gender. Gender translation error(s) can occur when translating from a source language with gendered nouns into a target language without gendered nouns, from a source language without gendered nouns into a target language with gendered nouns, and/or from a source language with gendered nouns into a target language with gendered nouns.

An APE model in accordance with many implementations can be used to correct the gender of translated word(s). In many implementations, training instances to train an APE model to correct gender errors can additionally include preceding text to add additional context to the translated text. For example, English phrase B can be immediately preceded by English phrase A. English phrase B can be translated into German, and the German translation can be translated back into English training text using NMT model(s). The English phrase B (i.e., the ground truth text), the English training text, and the preceding English phrase A can be saved as a training instance. The APE model can be trained by processing the English training text and the preceding English phrase A to generate edited text. In many implementations, the preceding English phrase A can provide additional and/or alternative context for editing gender error(s).

APE models can additionally or alternatively be used to edit text generated using a template engine. In many implementations, a template engine can determine a text template and a set of structured data responsive to user interface input. For example, a user can provide input of "how many lights are on in the kitchen". Template engine can determine the text template of "There are [#] of lights on in the [room]" as well as the set of structured data of "#=3; room=kitchen". Furthermore, template engine can generate natural language output of "There are 3 lights on in the kitchen" based on the determined text template and the set of structured data. However, a template engine can introduce errors(s) into the natural language output. For example, when only one light is turned on in the kitchen, the template engine can introduce error(s) into the natural language output of "There are 1 lights on in the kitchen" based on the text template of "There are [#] of lights on in the [room]" and the set of structured data "#=1; room=kitchen". An APE model can process natural language output of "There are 1 lights on in the kitchen" to generate an edited output of "There is 1 light on in the kitchen". Additionally or alternatively, the APE model can be trained to generate a variety of edited natural language outputs. For example, the text of "It is 75 degrees and sunny in Mountain View" can be processed using the APE model to generate varying outputs of: "In Mountain View it is 75 degrees and sunny"; "It is sunny in Mountain View. The temperature is 75 degrees"; "In Mountain View it is currently 75 degrees and sunny"; etc.

A training instance for training an APE model to edit natural language generated using the template engine can be automatically generated by processing a ground truth instance of natural language text using random noise to generate training text. In many implementations, random noise can include adding one or more words to the text, removing one or more words from the text, reordering one or more words in the text, and/or additional automatic alternation(s) of the text. The ground truth text and the training text can be stored as a training instance. For example, the text of "The thermostat is currently set to 72 degrees" can be processed using random noise to generate training text of "The thermostat is lights currently set to 72 degrees" (i.e. adding the word lights); "The thermostat is currently to 72 degrees" (i.e., removing the word set); "The thermostat is currently set 72 to degrees" (i.e., reordering the words to and 72); etc. Additional and/or alternative noise may added to ground truth text to generate training text.

Accordingly, various implementations set forth techniques for training automatic post-editing models using automatically generated training instances. Generating training instances in a fully supervised manner can be resource and/or labor intensive. For example, in generating a single training instance, relevant data must be transmitted to a client device of a human reviewer, resources of the client device utilized to enable the reviewer to provide an annotation, and the annotation transmitted back for training instance generation. Implementations disclosed herein utilize automatically generated training instances, enabling systems to quickly generate training data corresponding to a wide number of languages—without transmission of data to client devices of reviewers and without utilization of resources of those client devices in obtaining reviewer provided annotations. Additionally or alternatively, a large number of training instances can be automatically generated from a variety of diverse resources, which can improve the accuracy and/or robustness of edited translated text generated using an APE model trained on such training instances. In many implementations, a multilingual APE model can be trained using automatically generated training data. Multilingual models can frequently be trained with fewer training instances from each language. Computational resources (e.g., processor cycles, memory, battery power, and/or additional resources of a computing system) can be conserved by this reduced number of training instances required to train the multilingual APE model for many languages.

As described herein, edited translated text generated using the APE model can be utilized to cause performance of one or more computer actions. For example, the edited translated text can be visually and/or audibly rendered. Since the edited translated text is generated to remove translational and/or other errors, it is more quickly ascertainable by a user to which it is rendered. This can prevent the user from needing to request the text again, wasting computational resources, and/or can enable the user to more quickly provide further user interface input that is responsive to the edited translated text, reducing computer/user interaction duration and conserving resources. As another example, the edited translated text can be utilized in generating and/or transmitting command(s) (e.g., a command to control a smart device in accordance with the edited translated text). Since the edited translated text is generated to remove translational and/or other errors, it can prevent the wasteful transmission of incorrect commands and/or the wasteful implementation of incorrect commands.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
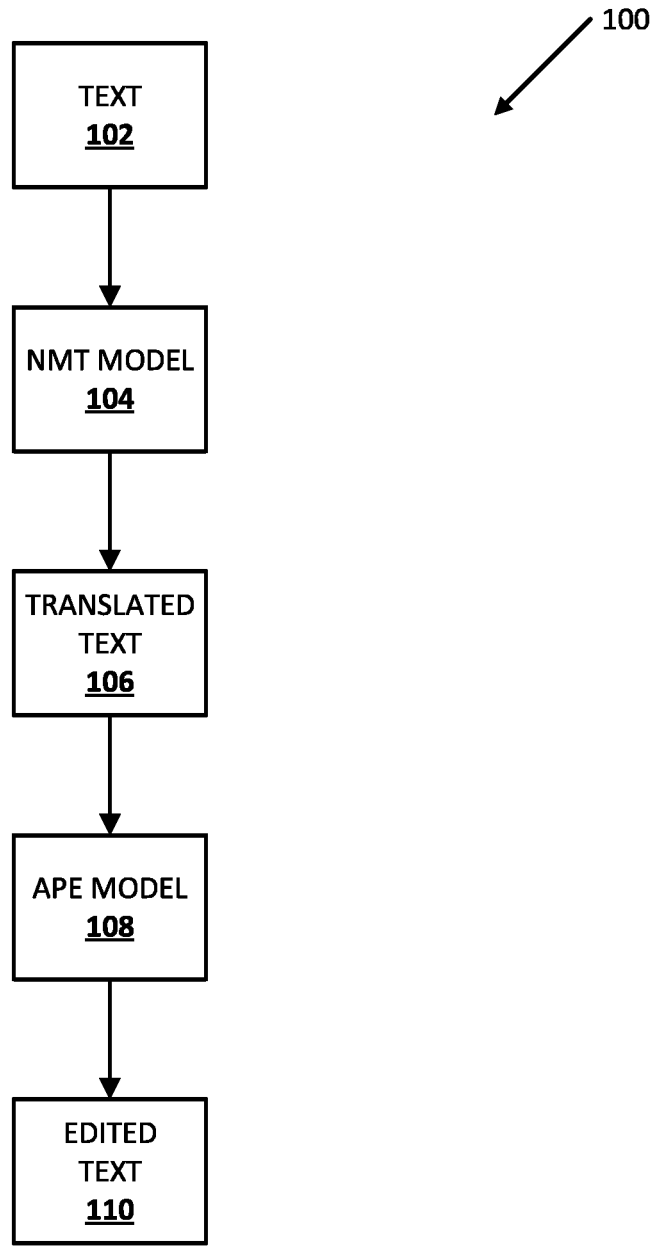
FIG. 1 illustrates an example of generating edited text using an automatic post-editing model in accordance with various implementations disclosed herein.

FIG. 1 illustrates an example of generating edited text using an APE model in accordance with various implementations. In the illustrated example 100, text 102 is processed using NMT model 104 to generate translated text 106. In many implementations, text 102 is in a source language and translated text 106 is in a target language. For example, source language English text can be translated to target language French text, source language German text can be translated to target language Chinese text, source language French text can be translated to target language Spanish text, and/or additional source language(s) text can be translated to additional target language(s) text. NMT model 104 can be trained for translating a specific source language into a specific target language (e.g., a distinct model translates French to English, another distinct model translates English to French, another distinct model translates French to German, etc.). Additionally or alternatively, NMT model 104 can be a multilingual model trained for translating many source languages into many target languages. For example, multilingual NMT model can be trained to translate English to French, French to English, German to English, English to German, etc.

NMT model 104 can introduce translation errors into translated text 106. For example, the word club meaning a cudgel can incorrectly be translated as the word club meaning an organization. APE model 108 can process translated text 106 to generate edited text 110, where translation error(s) introduced by NMT model 104 are corrected in edited text 110. In a variety of implementations, APE model 108 is an encoder-decoder model (e.g., a transformer model, a sequence to sequence model, and/or or additional encoder-decoder model(s)). Additionally or alternatively, APE model 108 can include a variety of types of machine learning models such as a feed forward neural network model, a recurrent neural network model, a convolutional neural network model, and/or additional types of neural network model(s). APE model 108 can be utilized in correcting a variety of translation errors including incorrectly translated word error(s), gender error(s), and/or additional translation error(s). In many implementations, a transformer model can include a transformer encoder as well as a transformer decoder. The transformer decoder can be utilized in processing text (such as translated text 106) to generate an encoded representation of the text. Predicted output (such as edited text 110) can be generated, token-by-token, using the transformer decoder attended to the encoded representation of the text. In many implementations, generating the predicted output, token-by-token, using the transformer decoder attended to the encoded representation of the text includes generating a probability distribution over a vocabulary of tokens at each iteration of processing using the transformer decoder. Each token in the vocabulary of tokens can be a distinct word in the vocabulary of the system. Additionally or alternatively, a corresponding token can be selected for an iteration from the vocabulary of tokens based on the probability distribution for the iteration. Furthermore, the selected token can be used as part of the input to the transformer decoder in a subsequent iteration.

In many implementations, APE model 108 is trained to correct errors introduced when translating a source language into a target language. In additional or alternative implementations, APE model 108 is a multilingual model and can correct errors introduced when translating a first language into a target language, a second language into a target language, a third language into a target language, etc. For example, a NMT model can translate Spanish text into English text. Similarly, a NMT model can translate French text into English text. A multilingual APE model can be utilized to edit both the English text translated from the Spanish text as well as the English text translated from the French text.

Figure 2:
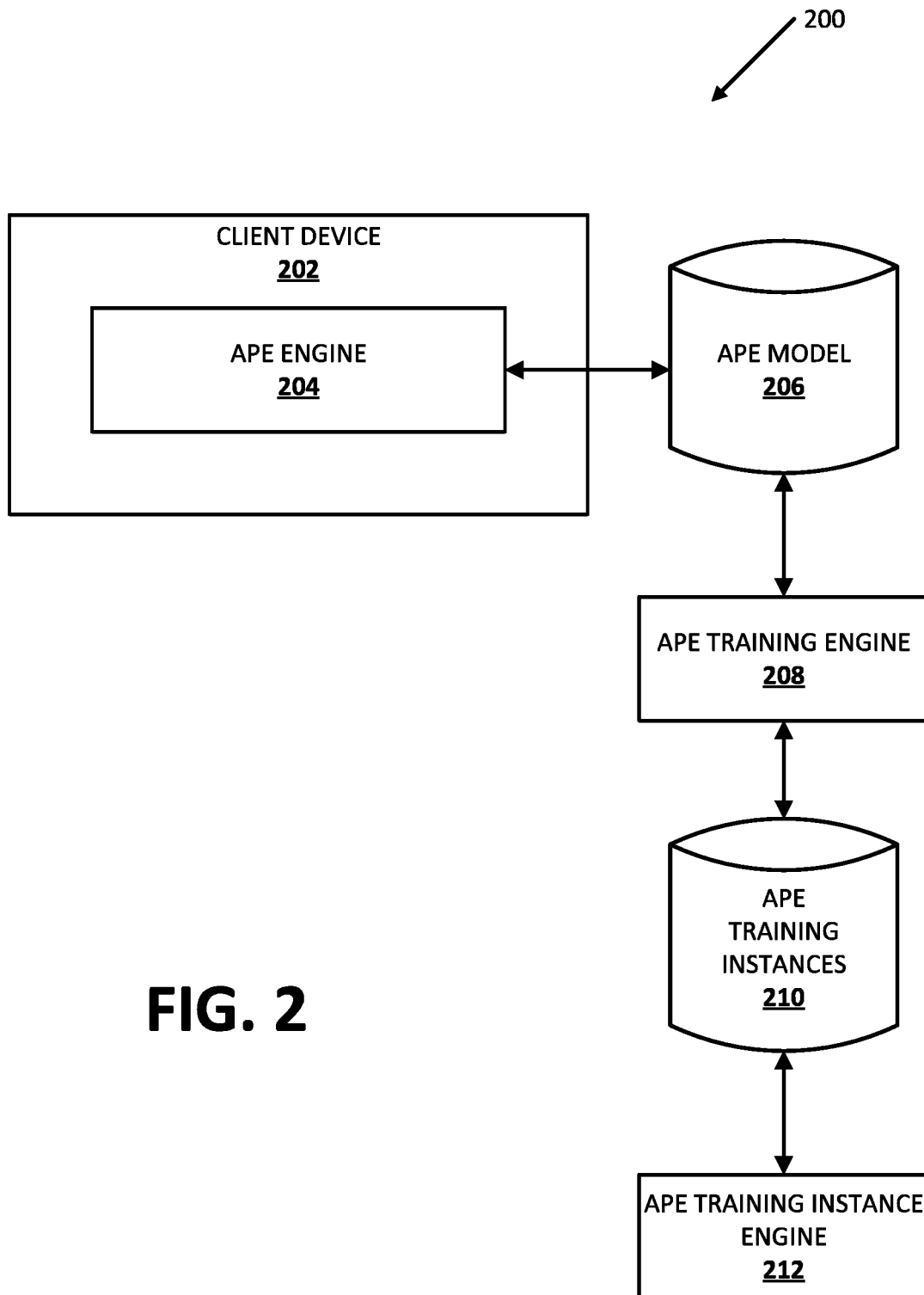
FIG. 2 illustrates an example environment in which various implementations disclosed herein can be implemented.

FIG. 2 illustrates an example environment in which implementations disclosed herein may be implemented. The example environment 200 in FIG. 2 includes client device 202, APE engine 204, APE model 206, APE training engine 208, APE training instances 210, APE training instance engine 212, and/or additional engine(s) and/or model(s) (not depicted). The client device 102 may be, for example, a standalone voice-activated speaker device, a desktop computing device, a laptop computing device, a tablet computing device a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch having a computing device, glasses having a computing device, a virtual or augmented reality computing device, etc.). Additional and/or alternative client devices may be provided.

APE engine 204, APE training engine 208, and APE training instance engine 212 are example components in which techniques described herein may interface. The operations performed by one or more engines 204, 208, 212 of FIG. 2 may be distributed across multiple computing systems. In some implementations, one or more aspects of engines 204, 208, 212 may be combined in a single system and/or one or more aspects may be implemented on the client device 202. For example, in some of those implementations, aspects of APE engine 204 may be combined with aspects of APE training engine 208. Engines in accordance with many implementations may each be implemented in one or more computing devices that communicate, for example, through a communication network. A communication network may include a wide area network such as the Internet, one or more local area networks ("LAN"s) such as Wi-Fi LANs, mesh networks, etc., and/or one or more bus subsystems. A communication network may optionally utilize one or more standard communication technologies, protocols, and/or inter-process communication techniques.

APE model 206 can be trained to process natural language text to generate edited text correcting word translation error(s), gender error(s), etc. In a variety of implementations, APE model 206 can be trained for editing text translated from a specific source language to a specific target language. For example, a first APE model can be trained to generate edited text based on text translated from French to English; a second APE model can be trained to generate edited text based on text translated from English to French; a third APE model can be trained to generate edited text based on text translated from French to German; etc. Additionally or alternatively, a multilingual APE model 206 can be trained to generate edited text based on multiple source languages translated into a target language. For example, the multilingual APE model can be trained to generate edited text based on text translated from German to English, based on text translated from Spanish to English, based on text translated from French to English, and/or based on text translated from additional and/or alternative language(s) to English. Multilingual APE model(s) in accordance with many implementations can be trained to generate text based on translations into additional and/or alternative target languages.

In a variety of implementations, client device 202, utilizing APE training engine 208, can train APE model 206 using APE training instances 210. Utilizing training instances to train an APE model is described with respect to process 500 of FIG. 5. APE training instance engine 212 can be utilized to generate APE training instances 210. Generating training instances is described with respect to process 400 of FIG. 4.

Figure 3:
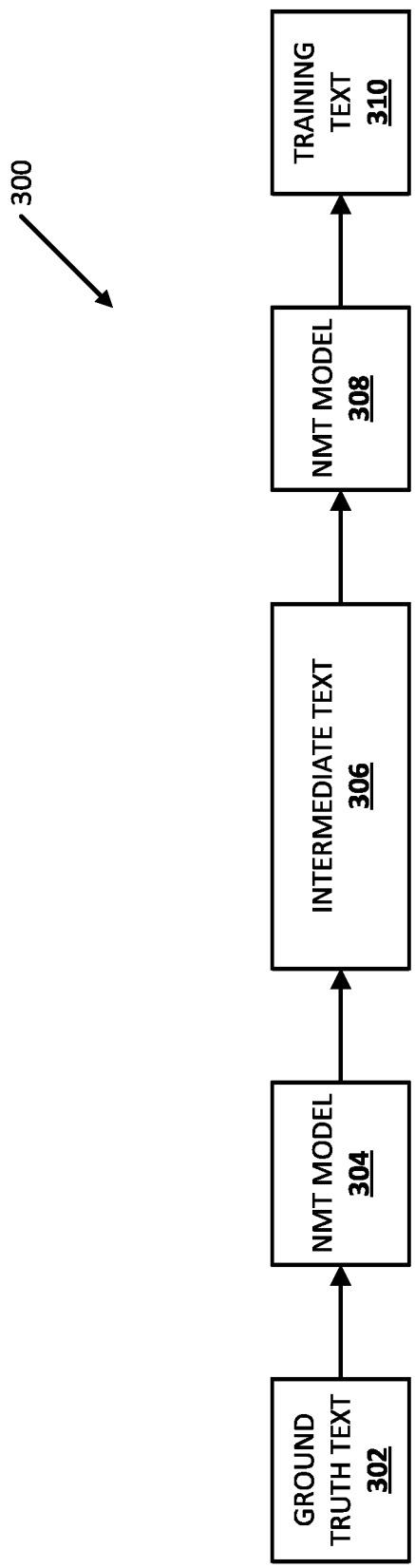
FIG. 3 illustrates automatically generating a training instance in accordance with implementations disclosed herein.

FIG. 3 illustrates an example of automatically generating an APE training instance in accordance with many implementations. Example 300 includes processing ground truth text 302 using NMT model 304 to generate intermediate text 306. In many implementations, ground truth text 302 is in first language and intermediate text is in a second language.

Intermediate text 306 can be processed by NMT model 308 to generate training text 310. In many implementations, training text 310 is in the first language. Training text 310 in the first language and ground truth text 302 in the first language can be stored as a training instance. In a variety of implementations, NMT model 304 and NMT model 308 can be distinct models. In other implementations, NMT model 304 and NMT model 308 can be included as portions of a multilingual NMT model which is trained to translate multiple language pairs. In a variety of implementations, translating text from a first language into a second language, and translating the resulting text in the second language back into the first language can introduce one or more translation errors. These translation error(s) can be corrected by processing the translated text using an APE model in accordance with many implementations.

Figure 4:
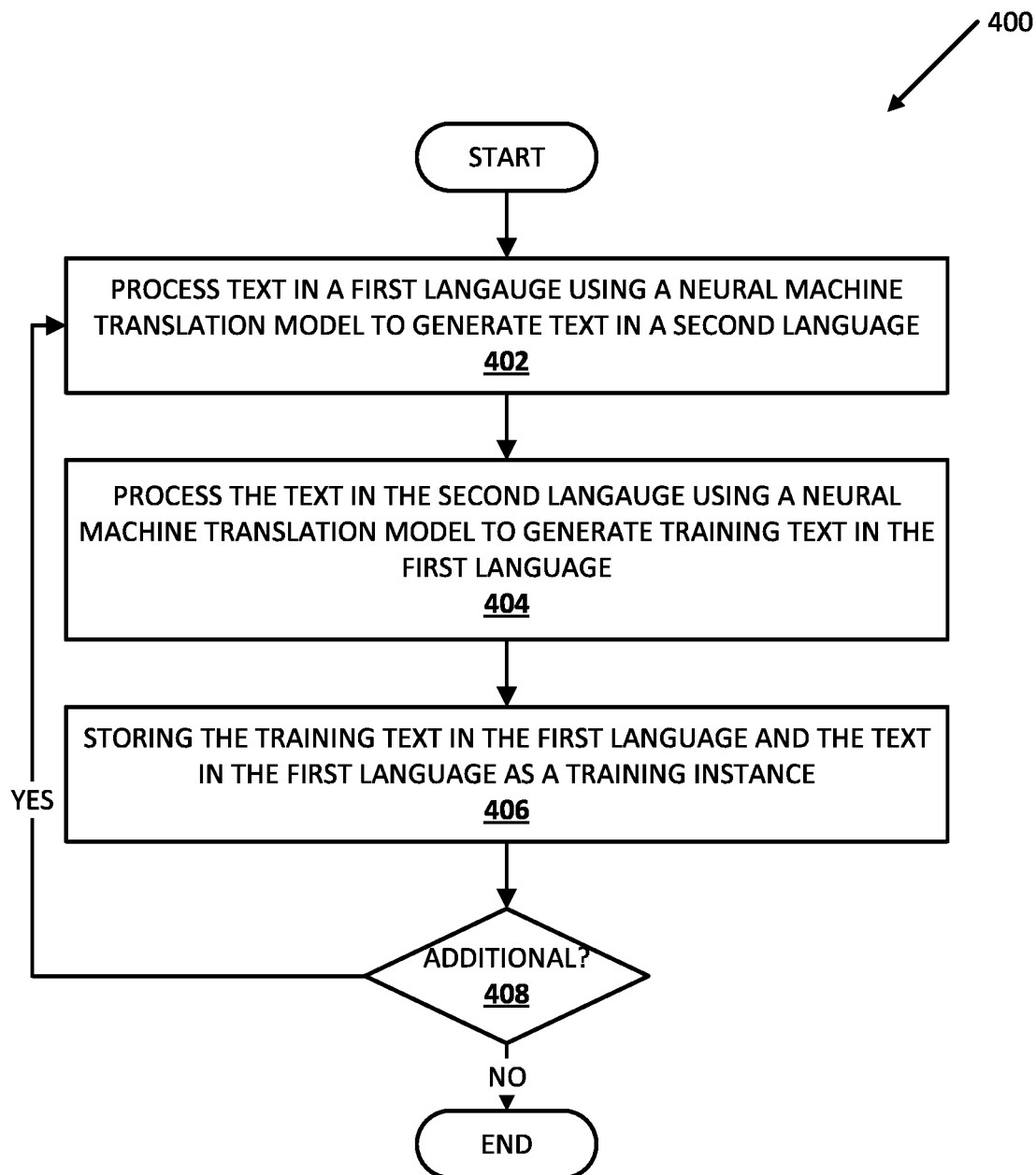
FIG. 4 is a flowchart illustrating an example process in accordance with implementations disclosed herein.

FIG. 4 is a flowchart illustrating a process 400 of automatically generating a training instance according to implementations disclosed herein. For convenience, the operations of the flowchart are described with reference to a system that performs operations. This system may include various components of various computer systems, such as one or more components of client device 202 of FIG. 2. Moreover, while operations of process 400 are shown in a particular order, this is not meant to be limiting. One or more operations may be reordered, omitted, and/or added.

At block 402, the system processes text in a first language using a NMT model to generate text in a second language. In many implementations, the text in the first language is utilized as the ground truth portion of the training instance. For example, the system can process French text using the NMT model to generate Spanish text.

At block 404, the system processes the text in the second language generated at block 402 using a NMT model to generate training text in the first language. For example, the system can process the Spanish text generated at block 402 using a NMT model to generate additional French text.

At block 406, the system stores the training text in the first language and the ground truth text in the first language as a training instance. For example, the system can store the training text generated at block 404 in French as well as the French text processed at block 402 as a training instance.

At block 408, the system determines whether to generate additional training instances. If so, the system proceeds back to block 402, and processes additional text in a first language before proceeding to blocks 404 and 406. If the system determines not to generate additional training instances, the process ends.

In some implementations, preceding text (i.e., a preceding sentence and/or phrase) can be stored as an additional portion of the training instance. For example, the French phrase immediately preceding the French text processed in block 402 can be stored as the preceding text portion of the training instance. The preceding text portion can be utilized to provide additional and/or alternative context to the APE model.

Figure 5:
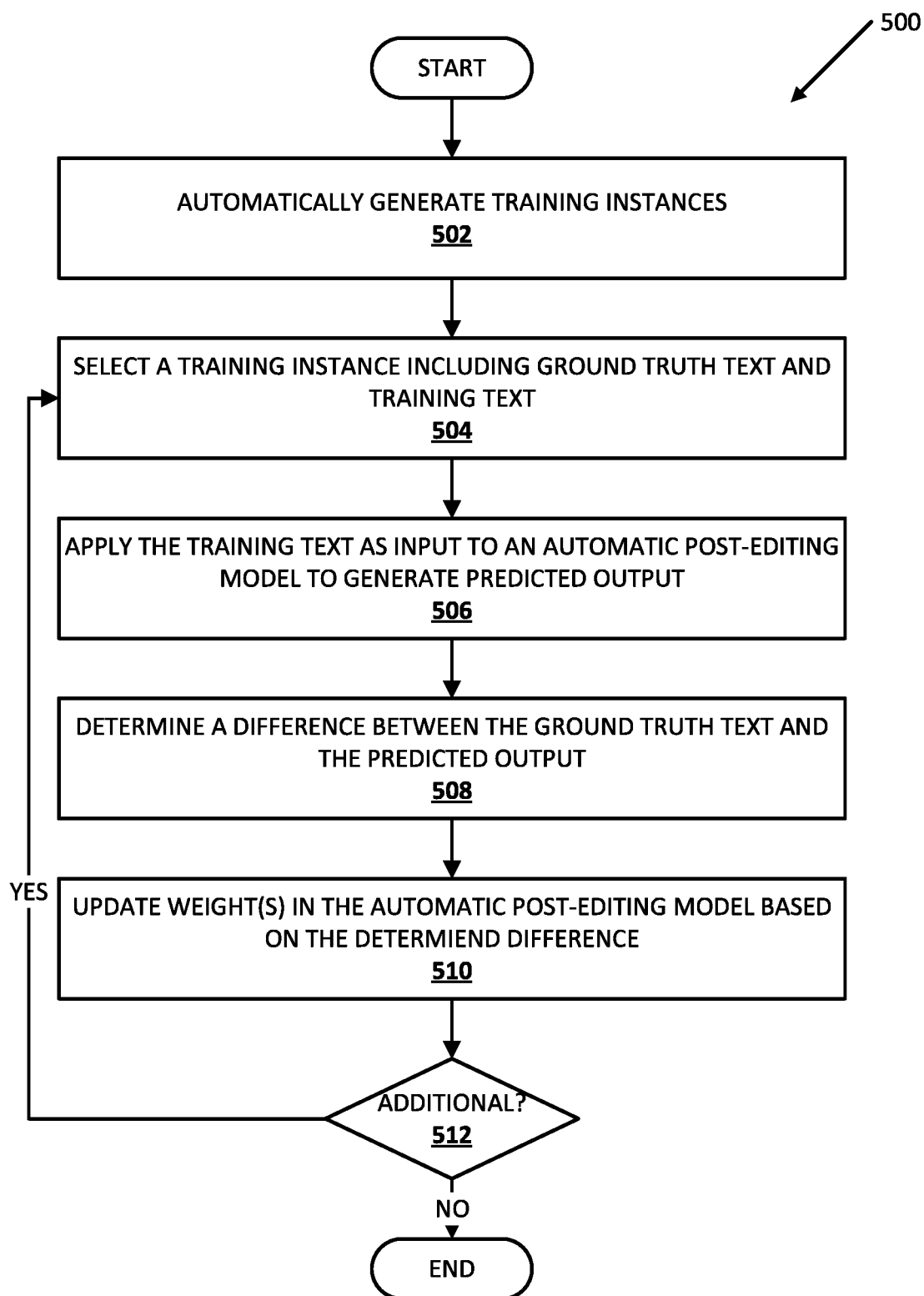
FIG. 5 is a flowchart illustrating another example process in accordance with implementations disclosed herein.

FIG. 5 is a flowchart illustrating a process 500 of training an APE model according to implementations disclosed herein. For convenience, the operations of the flowchart are described with reference to a system that performs operations. This system may include various components of various computer systems, such as one or more components of client device 202 of FIG. 2. Moreover, while operations of process 500 are shown in a particular order, this is not meant to be limiting. One or more operations may be reordered, omitted, and/or added.

At block 502, the system automatically generates training instances. In many implementations, the system can automatically generate training instances in accordance with process 400 of FIG. 4.

At block 504, the system selects a training instance including a ground truth text portion and a training text portion.

At block 506, the system applies the training text as input to an APE model to generate predicted output.

At block 508, the system determines a difference between the ground truth text and the predicted output.

At block 510, the system updates one or more weights in the APE model based on the difference determined at block 508. For example, the system can backpropagate the determined difference over the neural network model to update weights of the APE model.

At block 512, the system determines whether there are one or more additional unprocessed APE training instances. If so, the system proceeds back to block 504, selects an additional APE training instance, then performs blocks 506, 508, and 510 based on the additional APE training instance. In some implementations, at block 512, the system may determine not to process any additional APE training instances if one or more training criteria has been satisfied (e.g., a threshold number of epochs have occurred, a threshold duration of training has occurred, and/or all APE training instances have been processed). Although process 500 is described with respect to a non-batch learning technique, batch learning may additionally and/or alternatively be utilized.

Furthermore, although process 500 is described with respect to a training instance including a training text portion and a ground truth text portion, a training instance may additionally or alternatively include a preceding text portion. In some such implementations, the training text as well as the previous text can be processed using the APE model to generate predicted output at block 506. A difference between the predicted output and the ground truth text can be determined at block 508.

Figure 6:
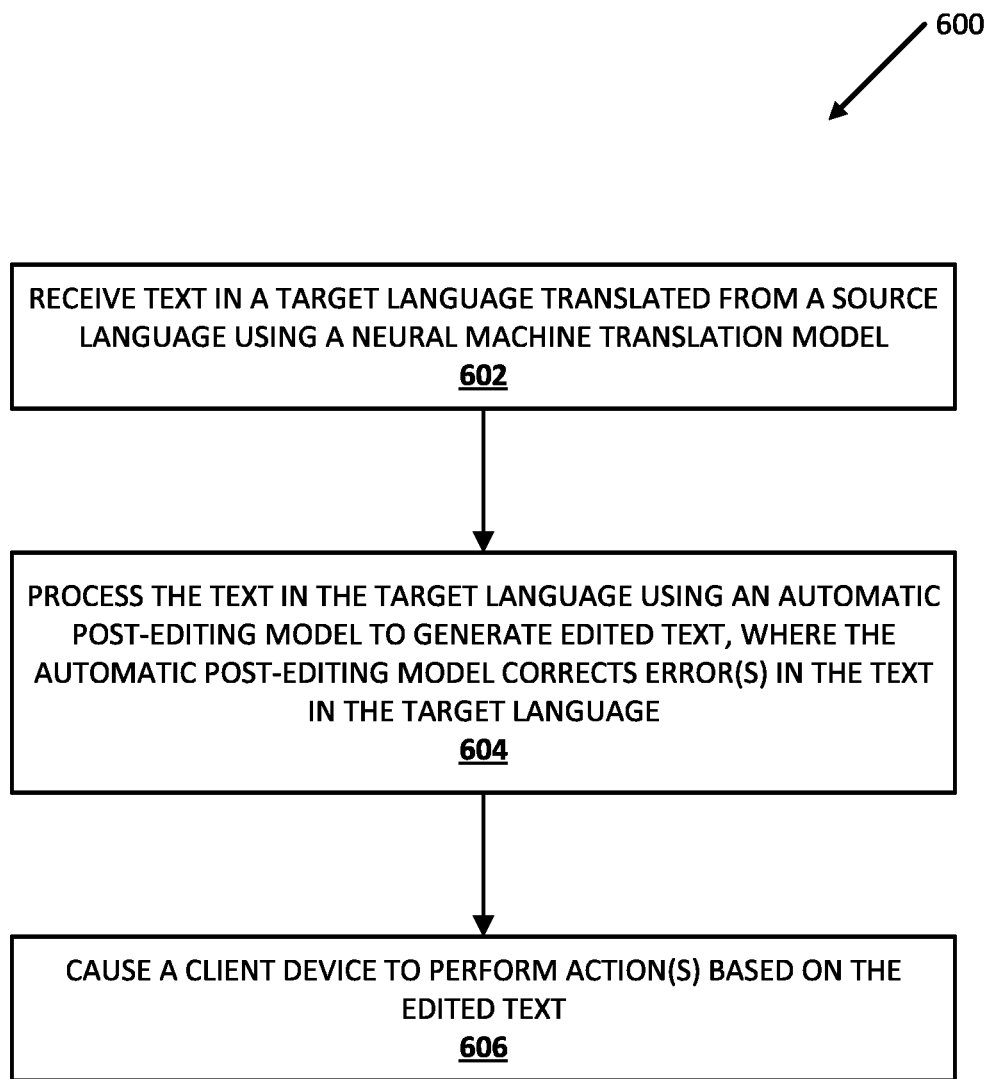
FIG. 6 is a flowchart illustrating another example process in accordance with implementations disclosed herein.

FIG. 6 is a flowchart illustrating a process 600 of using an APE model to generate edited text according to implementations disclosed herein. For convenience, the operations of the flowchart are described with reference to a system that performs operations. This system may include various components of various computer systems, such as one or more components of client device 202 of FIG. 2. Moreover, while operations of process 600 are shown in a particular order, this is not meant to be limiting. One or more operations may be reordered, omitted, and/or added.

At block 602, the system receives text in a target language translated using a NMT model from a source language. For example, the system can receive French text translated from German text using the NMT model. In many implementations, the NMT model introduces error(s) into the text in the target language when translating from the source language to the target language.

At block 604, the system processes the text in the target language using an APE model to generate edited text. In many implementations, the translation error(s) introduced by the NMT model at block 402 are corrected in the edited text by the APE model.

At block 606, the system causes a client device to perform one or more actions based on the edited text. For example, the system can process the edited text using a text to speech engine to generate an audio waveform corresponding to the edited text. The audio waveform can be rendered using one or more speakers of the client device. Additionally or alternatively, the system can process the edited text to determine one or more actions to control a device, and the device can perform the one or more actions. Networked hardware devices can include: a smart thermostat, a smart light, networked cameras, smart light switches, and/or other device(s). For example, the edited text of "turn off all the lights" can be used to turn off all networked smart lights.

Figure 7:
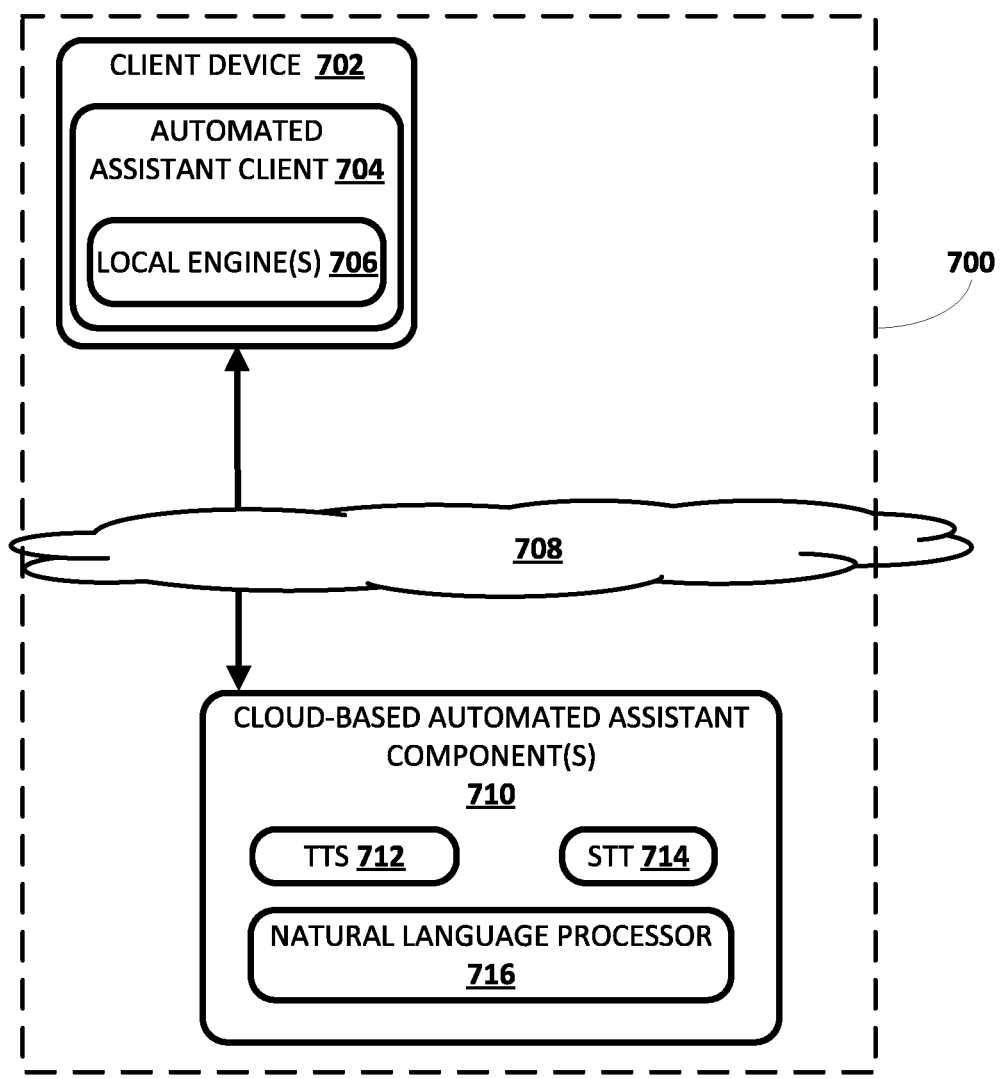
FIG. 7 illustrates another example environment in which implementations disclosed herein can be implemented.

Turning to FIG. 7, an example environment in which implementations disclosed herein can be implemented. FIG. 7 includes a client computing device 702, which execute an instance of an automated assistant client 704. One or more cloud-based automated assistant components 710 can be implemented on one or more computing systems (collectively referred to as a "cloud" computing system) that are communicatively coupled to client device 702 via one or more local and/or wide area networks (e.g., the Internet) indicated generally at 708.

An instance of an automated assistant client 704, by way of its interactions with one or more cloud-based automated assistant components 710, may form what appears to be, from the user's perspective, a logical instance of an automated assistant 700 with which the user may engage in a human-to-computer dialog. It thus should be understood that in some implementations, a user that engages with an automated assistant client 704 executing on client device 702 may, in effect, engage with his or her own logical instance of an automated assistant 700. For the sakes of brevity and simplicity, the term "automated assistant" as used herein as "serving" a particular user will often refer to the combination of an automated assistant client 704 executing on a client device 702 operated by the user and one or more cloud-based automated assistant components 710 (which may be shared amongst multiple automated assistant clients of multiple client computing devices). It should also be understood that in some implementations, automated assistant 700 may respond to a request from any user regardless of whether the user is actually "served" by that particular instance of automated assistant 700.

The client computing device 702 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 702 may be distributed between multiple computing devices. For example, one or more operations of client computing device 702 may be distributed between a mobile smartphone and a vehicle computing device. Furthermore, operations of client computing device 702 may be repeated between multiple computing devices (which in some cases may be communicatively coupled). As a further example, a mobile smartphone as well as a vehicle interface device may each implement operations of automated assistant 700, such as a mobile smartphone and a vehicle interface device both including an invocation engine (described below). In various implementations, the client computing device 702 may optionally operate one or more other applications that are in additional to automated assistant client 704, such as a message exchange client (e.g., SMS, MMS, online chat), a browser, and so forth. In some of those various implementations, one or more of the other applications can optionally interface (e.g. via an application programming interface) with the automated assistant 704, or include their own instance of an automated assistant application (that may also interface with the cloud-based automated assistant component(s) 710).

Automated assistant 700 engages in human-to-computer dialog sessions with a user via user interface input and output devices of the client device (not pictured). To preserve user privacy and/or to conserve resources, in many situations a user must often explicitly invoke the automated assistant 700 before the automated assistant will fully process a spoken utterance. The explicit invocation of the automated assistant 700 can occur in response to certain user interface input received at the client device 702. For example, user interface inputs that can invoke the automated assistant 700 via the client device 702 can optionally include actuations of a hardware and/or virtual button of the client device 702. Moreover, the automated assistant client can include one or more local engines 706, such as an invocation engine that is operable to detect the presence of one or more spoken invocation phrases. The invocation engine can invoke the automated assistant 700 in response to detection of one or more of the spoken invocation phrases. For example, the invocation engine can invoke the automated assistant 700 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 702, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 700. As used herein, "invoking" the automated assistant 700 can include causing one or more previously inactive functions of the automated assistant 700 to be activated. For example, invoking the automated assistant 700 can include causing one or more local engines 706 and/or cloud-based automated assistant components 710 to further process audio data frames based on which the invocation phrase was detected, and/or one or more following audio data frames (whereas prior to invoking no further processing of audio data frames was occurring).

The one or more local engine(s) 706 of automated assistant 704 can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), an APE engine (such as APE engine 204 in FIG. 2), a template engine and/or other local components. Because the client device 702 is relatively constrained in terms of computing resources (e.g., processor cycles, memory, battery, etc.), the local engines 706 may have limited functionality relative to any counterparts that are included in cloud-based automated assistant components 710.

In many implementations, the template engine can identify a text template and a set of structured data response to user interface input. For example, a user can provide input of "turn on the lights in here". The template engine can identify a text template of "OK, turning on [#] of lights in the [room]" and a set of structured data of "#—4, room—living room". In many implementations, the template engine can generate natural language text responsive to the user interface input, such as "OK, turning on 4 lights in the living room" based on the identified text template and the set of structured data. The template engine can introduce one or more errors into the natural language text responsive to the user interface input. In some such implementations, the error(s) can be corrected by processing the natural language using an APE model. Additionally or alternatively, the APE model can process natural language text generated using the template engine to increase the variety of outputs provided by the automated assistant client.

Cloud-based automated assistant components 710 leverage the virtually limitless resources of the cloud to perform more robust and/or more accurate processing of audio data, and/or other user interface input, relative to any counterparts of the local engine(s) 706. Again, in various implementations, the client device 702 can provide audio data and/or other data to the cloud-based automated assistant components 710 in response to the invocation engine detecting a spoken invocation phrase, or detecting some other explicit invocation of the automated assistant 700.

The illustrated cloud-based automated assistant components 710 include a cloud-based TTS module 712, a cloud-based STT module 714, and a natural language processor 716. In some implementations, one or more of the engines and/or modules of automated assistant 700 may be omitted, combined, and/or implemented in a component that is separate from automated assistant 700. Further, in some implementations automated assistant 700 can include additional and/or alternative engines and/or modules.

Cloud-based STT module 714 can convert audio data into text, which may then be provided to natural language processor 716. In various implementations, the cloud-based STT module 714 can convert audio data into text based at least in part on indications of speaker labels and assignments that are provided by an assignment engine (not illustrated).

Cloud-based TTS module 712 can convert textual data (e.g., natural language responses formulated by automated assistant 700) into computer-generated speech output. In some implementations, TTS module 712 may provide the computer-generated speech output to client device 702 to be output directly, e.g., using one or more speakers. In other implementations, textual data (e.g., natural language responses) generated by automated assistant 700 may be provided to one of the local engine(s) 706, which may then convert the textual data into computer-generated speech that is output locally.

Natural language processor 716 of automated assistant 700 processes free form natural language input and generates, based on the natural language input, annotated output for use by one or more other components of the automated assistant 700. For example, the natural language processor 716 can process natural language free-form input that is textual input that is a conversion, by STT module 714, of audio data provided by a user via client device 702. The generated annotated output may include one or more annotations of the natural language input and optionally one or more (e.g., all) of the terms of the natural language input. In some implementations, the natural language processor 716 is configured to identify and annotate various types of grammatical information in natural language input. For example, the natural language processor 716 may include a part of speech tagger (not depicted) configured to annotate terms with their grammatical roles. Also, for example, in some implementations the natural language processor 716 may additionally and/or alternatively include a dependency parser (not depicted) configured to determine syntactic relationships between terms in natural language input.

In some implementations, the natural language processor 716 may additionally and/or alternatively include an entity tagger (not depicted) configured to annotate entity references in one or more samples such as references to people (including, for instance, literary characters, celebrities, public figures, etc.), organizations, locations (real and imaginary), and so forth. The entity tagger of the natural language processor 716 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 716 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 716 may rely on annotations from one or more other components of the natural language processor 716. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 716 may use related prior input and/or other related data outside of the particular natural language input to determine one or more annotations.

Figure 8:
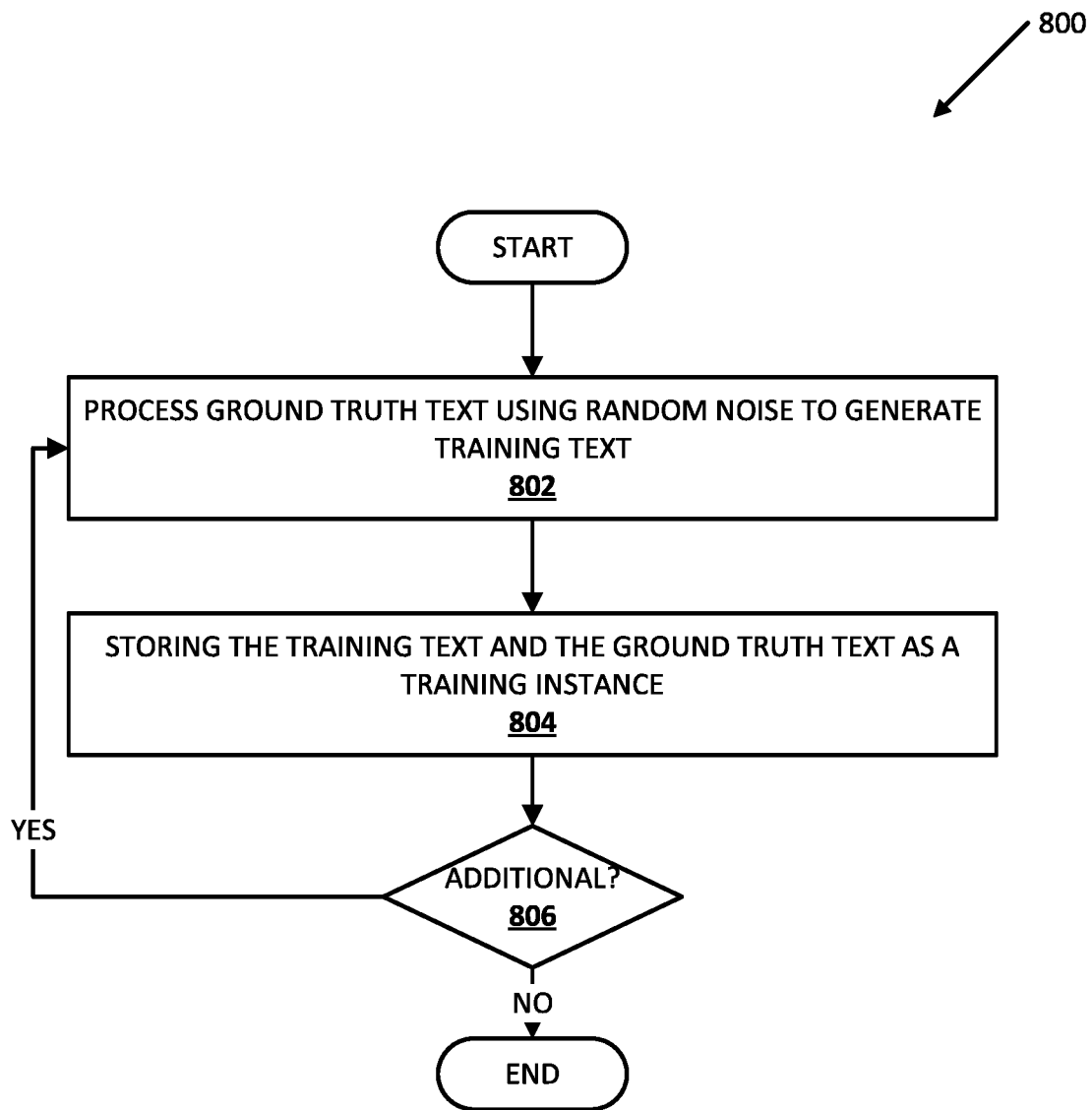
FIG. 8 is a flowchart illustrating another example process in accordance with implementations disclosed herein.

FIG. 8 is a flowchart illustrating a process 800 of automatically generating a natural language training instance using noise according to implementations disclosed herein. For convenience, the operations of the flowchart are described with reference to a system that performs operations. This system may include various components of various computer systems, such as one or more components of client device 202 of FIG. 2. Moreover, while operations of process 800 are shown in a particular order, this is not meant to be limiting. One or more operations may be reordered, omitted, and/or added.

At block 802, the system processes the output using random noise to generate training text. For example, random noise can include inserting one or more additional words into the text, removing one or more words from the text, reordering one or more words in the text, and/or performing additional text manipulation.

At block 804, the system stores the natural language text and the training text as a training instance.

At block 806, the system determines whether to generate additional training instances. If so, the system proceeds back to block 802 and processes additional natural language text noise before proceeding to block 804. If at block 806 the system determines to not generate additional training instances, the process ends.

Figure 9:
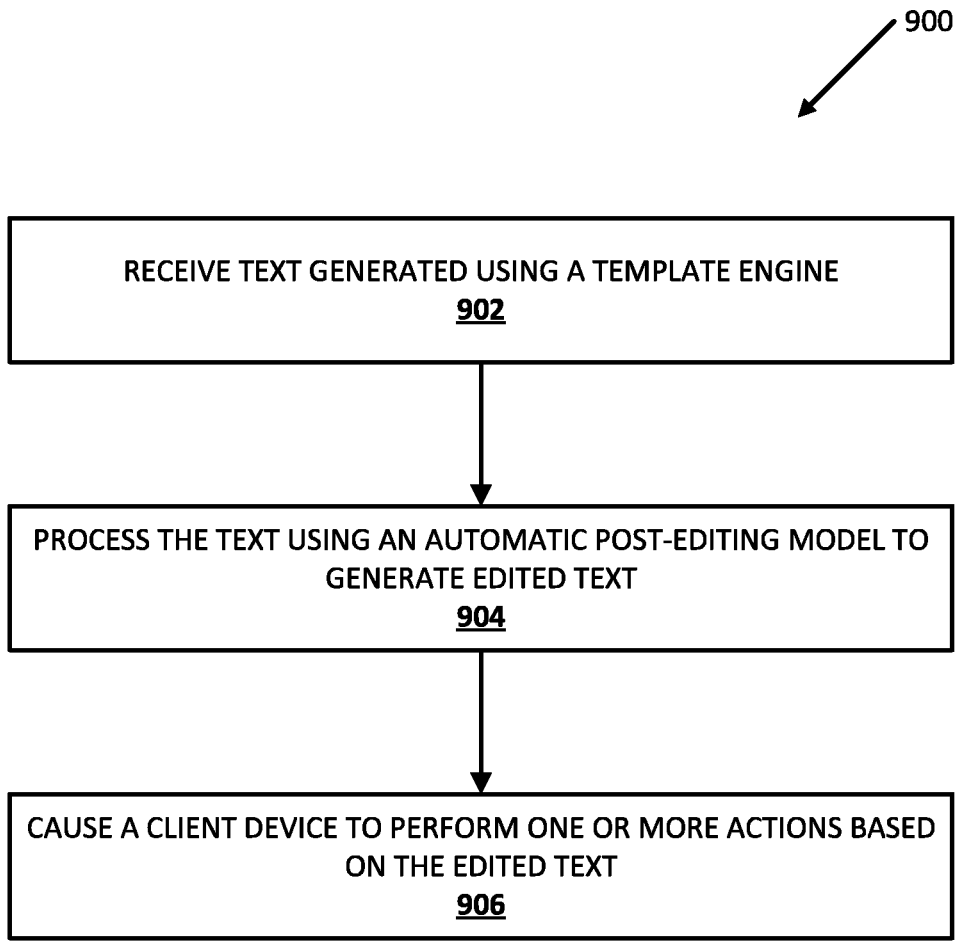
FIG. 9 is a flowchart illustrating another example process in accordance with implementations disclosed herein.

FIG. 9 is a flowchart illustrating a process 900 of using an APE model to edit text generated using a template engine according to implementations disclosed herein. For convenience, the operations of the flowchart are described with reference to a system that performs operations. This system may include various components of various computer systems, such as one or more components of client device 202 of FIG. 2. Moreover, while operations of process 900 are shown in a particular order, this is not meant to be limiting. One or more operations may be reordered, omitted, and/or added.

At block 902, the system receives text generated using a template engine. In many implementations, the text is generated using the template engine responsive to user interface input. In many implementations, one or more grammatical errors are introduced into the generated text by the template engine.

At block 904, the system processes the text using an APE model to generate edited text. In many implementations, the APE model corrects the one or more grammatical errors introduced by the template engine.

At block 906, the system causes a client device to perform one or more actions based on the edited text. For example, the system can process the edited text using a text to speech engine to generate an audio waveform corresponding to the edited text. The audio waveform can be rendered using one or more speakers of a client device. Additionally or alternatively, the system can determine one or more actions for a hardware device based on the edited text, and the system can cause the hardware device to perform the one or more actions.

Figure 10:
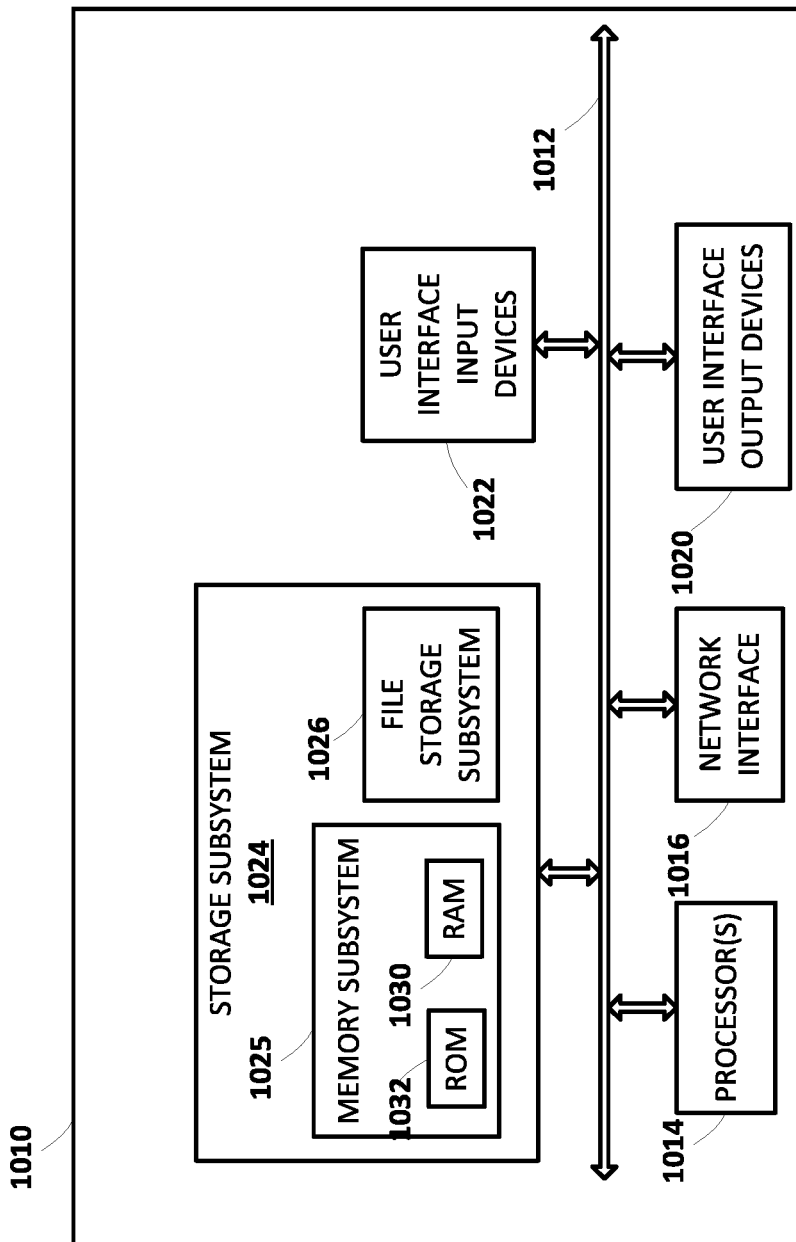
FIG. 10 illustrates an example architecture of a computing device.

FIG. 10 is a block diagram of an example computing device 1010 that may optionally be utilized to perform one or more aspects of techniques described herein. In some implementations, one or more of a client computing device, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of one or more of the processes of FIG. 4, FIG. 5, FIG. 6, FIG. 8, and/or FIG. 9, as well as to implement various components depicted in FIG. 2.

These software modules are generally executed by processor 1014 alone or in combination with other processors. Memory 1025 used in the storage subsystem 1024 can include a number of memories including a main random access memory ("RAM") 1030 for storage of instructions and data during program execution and a read only memory ("ROM") 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes receiving an automatically generated training instance including training text in a target language and ground truth text in the target language. The method further includes processing the training text using an automatic post-editing model to generate predicted output, wherein the automatic post-editing model, when trained, is used in correcting one or more translation errors introduced by a neural machine translation model translating text from a source language into the target language. The method further includes determining a difference between the predicted output and the ground truth training text. The method further includes updating one or more weights in the automatic post-editing model based on the determined difference.

These and other implementations of the technology disclosed herein can include one or more of the following features.

In some implementations, the method further includes automatically generating the training instance, wherein automatically generating the training instance includes processing the ground truth text in the target language using the neural machine translation model to generate text in the source language. In some implementations, the method further includes processing the generated text in the source language using the neural machine translation model to generate the training text in the target language. In some versions of the implementation, one or more translation errors introduced by the neural machine translation model are one or more words incorrectly translated from the source language to the target language. In some versions of those implementations, the one or more translation errors introduced by the neural machine translation model are one or more words translated with an incorrect gender from the source language into the target language. In some versions of those implementations, the received automatically generated training instance further includes preceding text, in the target language, that precedes the ground truth text, in an electronic resource from which the ground truth text is obtained. In some versions of those implementations, processing the training text using the automatic post-editing model to generate the predicted output further includes processing the training text and processing the preceding text using the automatic post-editing model to generate the predicted output.

In some implementations, the automatic post-editing model is a transformer model that includes a transformer encoder and a transformer decoder, wherein processing the training text using the automatic post-editing model to generate the predicted output includes processing the training text using the transformer encoder to generate an encoded representation of the training text. The method further includes generating the predicted output, token-by-token, using the transformer decoder attended to the encoded representation of the training text. In some versions of those implementations, generating the predicted output, token-by-token, using the transformer decoder attended to the encoded representation of the training text includes generating, at each of a plurality of iterations of processing using the transformer decoder, a probability distribution over a vocabulary of tokens. The method further includes selecting, from the vocabulary of tokens and based on the probability distribution for the iteration, a corresponding token for the iteration. The method further includes using the selected token as part of input to the transformer decoder in a subsequent iteration of the iterations of processing.

In some implementations, the automatic post-editing model is a sequence to sequence model.

In some implementations, subsequent to updating one or more weights in the automatic post-editing model, the method further includes receiving input text generated using the neural machine translation model. The method further includes processing the input text using the trained automatic post-editing model to generate edited text. The method further includes causing a client device to perform one or more actions based on the edited text. In some versions of those implementations, causing the client device to perform one or more actions based on the edited text includes processing the edited text using a text to speech engine to generate an audio waveform corresponding to the edited text. The method further includes causing the client device to render the audio waveform via one or more speakers of the client device. In some versions of those implementations, causing the client device to perform one or more actions based on the edited text includes processing the edited text to determine one or more device actions of a device associated with the client device. The method further includes causing the device to perform the one or more device actions. In some versions of those implementations, the device associated with the client device is a light, a thermostat, or a camera.

In some implementations, a method implemented by one or more processors is provided that includes receiving text generated using an automated assistant client, wherein the automated assistant client generates natural language text based on a text template and based on a set of structured data, and wherein the text includes one or more errors introduced by the automated assistant client. The method further includes processing the text using an automatic post-editing model to generate edited text, wherein the edited text, generated based on processing the text using the automatic post-editing model, corrects the one or more errors in the text introduced by the automated assistant client. The method further includes causing a client device to perform one or more actions based on the edited text.

These and other implementations of the technology disclosed herein can include one or more of the following features.

In some implementations, the automated assistant client generates natural language text based on the text template and based on the set of structured data by generating text based on the text template and based on the set of structured data using a template engine of the automated assistant client. In some versions of those implementations, the one or more errors in the text introduced by the template engine is a subject-verb agreement error in the text.

In some implementations, the method further includes generating the text, wherein generating the text includes receiving user interface input, wherein the user interface input is a query provided by a user. The method further includes identifying the text template responsive to the user interface input. The method further includes determining the set of structured data responsive to the user interface input. The method further includes determining the text based on the text template and based on the set of structured data.

In some implementations, the automatic post-editing model is trained using a training instance including training text and ground truth text, and wherein the training text is generated by processing the ground truth text using random noise to generate the training text, wherein processing the ground truth text using random noise to generate the training text comprises inserting one or more words into the ground truth text, deleting one or more words from the ground truth text, or reordering one or more words in the ground truth training text.

In some implementations, a method implemented by one or more processors is provided that includes processing a first instance of text in a target language using a multilingual automatic post-editing model to generate first edited text, wherein the first instance of text in the target language is generated using a neural machine translation model translating a first source language to the target language, wherein the multilingual automatic post-editing model is used in correcting one or more translation errors introduced by the neural machine translation model, and wherein the multilingual post-editing model is trained for use in correcting translation errors in the target language translated from any one of a plurality of source languages. The method further includes causing a client device to perform one or more actions based on the first edited text. The method further includes processing a second instance of text in the target language using the multilingual post-editing model to generate second edited text, wherein the second instance of text in the target language is generated using a neural machine translation model translating a second source text in a second source language to the target language. The method further includes causing the client device to perform one or more actions based on the second edited text.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
   detecting a spoken utterance at a client device, wherein the spoken utterance includes an indication of one or more device actions of a device associated with the client device, and wherein the spoken utterance is directed to an automated assistant executing at least in part on the client device;
   in response to the spoken utterance being detected at the client device:
      generating, by the automated assistant, natural language text, wherein generating the natural language text comprises applying, to a text template, structured data that is responsive to the spoken utterance;
      processing the natural language text generated based on applying the structured data that is responsive to the spoken utterance to the text template, using an automatic post-editing model to generate edited text, wherein the edited text, generated based on processing the text using the automatic post-editing model, corrects one or more errors in the natural language text; and
      causing the client device to perform one or more actions based on the edited text, wherein causing the client device to perform the one or more actions based on the edited text comprises:
         processing the edited text to determine the one or more device actions of the device associated with the client device; and
         causing the device to perform the one or more device actions.

2. The method of claim 1, wherein the one or more errors in the natural language text include a subject-verb agreement error in the natural language text.

3. The method of claim 1, wherein the text template comprises one or more fixed terms and one or more variables, and wherein generating the natural language text comprises using the set of structured data in populating the one or more variables.

4. The method of claim 1, wherein the automatic post-editing model is a transformer model that includes a transformer encoder and a transformer decoder, and wherein processing the natural language text using the automatic post-editing model to generate the edited text comprises:
   processing the natural language text using the transformer encoder to generate an encoded representation of the natural language text; and
   generating the edited text, token-by-token, using the transformer decoder attended to the encoded representation of the natural language text.

5. The method of claim 4, wherein generating the predicted output, token-by-token, using the transformer decoder attended to the encoded representation of the natural language text comprises:
   generating, at each of a plurality of iterations of processing using the transformer decoder, a probability distribution over a vocabulary of tokens;
   selecting, from the vocabulary of tokens and based on the probability distribution for the iteration, a corresponding token for the iteration; and
   using the selected token as part of input to the transformer decoder in a subsequent iteration of the iterations of processing.

6. The method of claim 1, wherein the automatic post-editing model is a sequence to sequence model.

7. The method of claim 1, wherein causing the client device to perform one or more actions based on the edited text comprises:
   processing the edited text using a text to speech engine to generate an audio waveform corresponding to the edited text; and
   causing the client device to render the audio waveform via one or more speakers of the client device.

8. The method of claim 1, wherein the device associated with the client device is a light, a thermostat, or a camera.

9. The method of claim 1, wherein the automatic post-editing model is trained using a training instance including training text and ground truth text, and wherein the training text is generated by:
   processing the ground truth text using random noise to generate the training text wherein processing the ground truth text using random noise to generate the training text comprises inserting one or more words into the ground truth text, deleting one or more words from the ground truth text, and/or reordering one or more words in the ground truth text.

10. The method of claim 9, wherein processing the ground truth text using random noise to generate the training text comprises:
    inserting one or more words into the ground truth text.

11. The method of claim 10, wherein processing the ground truth text using random noise to generate the training text comprises:
    reordering one or more words in the ground truth training text.

12. The method of claim 9, wherein processing the ground truth text using random noise to generate the training text comprises:
    deleting one or more words from the ground truth text.

13. The method of claim 1, wherein the automatic post-editing model is trained for use in correcting one or more translation errors introduced by a neural machine translation model translating text from a source language into a target language.

14. A system, comprising:
memory storing instructions; and
one or more processors executing the instructions to:
- detect a spoken utterance at a client device, wherein the spoken utterance includes an indication of one or more device actions of a device associated with the client device, and wherein the spoken utterance is directed to an automated assistant executing at least in part on the client device;
- in response to the spoken utterance being detected at the client device:
    - generate natural language text, wherein in generating the natural language text one or more of the processors are to apply, to a text template, structured data that is responsive to the spoken utterance;
    - process the natural language text generated based on applying the structured data that is responsive to the spoken utterance to the text template, using an automatic post-editing model to generate edited text, wherein the edited text, generated based on processing the text using the automatic post-editing model, corrects one or more errors in the natural language text; and
    - cause the client device to perform one or more actions based on the edited text, wherein causing the client device to perform the one or more actions based on the edited text comprises:
        - process the edited text to determine the one or more device actions of the device associated with the client device; and
        - cause the device to perform the one or more device actions.

15. The system of claim 14, wherein the text template comprises one or more fixed terms and one or more variables, and wherein generating the natural language text comprises using the set of structured data in populating the one or more variables.

16. The system of claim 14, wherein the automatic post-editing model is a transformer model that includes a transformer encoder and a transformer decoder, and wherein in processing the natural language text using the automatic post-editing model to generate the edited text one or more of the processors are to:
- process the natural language text using the transformer encoder to generate an encoded representation of the natural language text; and
- generate the edited text, token-by-token, using the transformer decoder attended to the encoded representation of the natural language text.

17. The system of claim 14, wherein in generating the predicted output, token-by-token, using the transformer decoder attended to the encoded representation of the natural language text one or more of the processors are to:
- generate, at each of a plurality of iterations of processing using the transformer decoder, a probability distribution over a vocabulary of tokens;
- select, from the vocabulary of tokens and based on the probability distribution for the iteration, a corresponding token for the iteration; and
- use the selected token as part of input to the transformer decoder in a subsequent iteration of the iterations of processing.

18. The system of claim 14, wherein in causing the client device to perform one or more actions based on the edited text one or more of the processors are to:
- process the edited text using a text to speech engine to generate an audio waveform corresponding to the edited text; and
- cause the client device to render the audio waveform via one or more speakers of the client device.

19. The system of claim 14, wherein the automatic post-editing model is trained using a training instance including training text and ground truth text, and wherein the training text is generated by:
- processing the ground truth text using random noise to generate the training text, wherein processing the ground truth text using random noise to generate the training text comprises inserting one or more words into the ground truth text, deleting one or more words from the ground truth text, and/or reordering one or more words in the ground truth text.

* * * * *